(12) United States Patent
Rice, II et al.

(10) Patent No.: US 9,917,428 B2
(45) Date of Patent: Mar. 13, 2018

(54) MULTIPLE EXPLOSION PROOF CHAMBERS DEVICE AND METHOD

(71) Applicant: SPECTRUM CAMERA SOLUTIONS, LLC, Houston, TX (US)

(72) Inventors: Hubert Rice, II, Houston, TX (US); Aaron F. Williams, Houston, TX (US)

(73) Assignee: SPECTRUM CAMERA SOLUTIONS, LLC, Houston, TX (US)

(*) Notice: Subject to any disclaimer, the term of this patent is extended or adjusted under 35 U.S.C. 154(b) by 0 days.

(21) Appl. No.: 15/426,571

(22) Filed: Feb. 7, 2017

(65) Prior Publication Data

US 2017/0271856 A1  Sep. 21, 2017

Related U.S. Application Data

(63) Continuation-in-part of application No. 29/558,402, filed on Mar. 17, 2016.

(60) Provisional application No. 62/309,597, filed on Mar. 17, 2016.

(51) Int. Cl.
*H02G 3/08* (2006.01)
*H02G 3/16* (2006.01)

(52) U.S. Cl.
CPC ............ *H02G 3/088* (2013.01); *H02G 3/083* (2013.01); *H02G 3/086* (2013.01); *H02G 3/16* (2013.01)

(58) Field of Classification Search
CPC .......... H02G 3/088; H02G 3/086; H02G 3/16; H02G 3/083

USPC .................................................. 174/541, 520
See application file for complete search history.

(56) References Cited

U.S. PATENT DOCUMENTS

| | | | |
|---|---|---|---|
| 3,743,800 A | 7/1973 | Appleton et al. | |
| 3,974,933 A | 8/1976 | Toth et al. | |
| 4,425,609 A * | 1/1984 | Grindle | F21V 25/12 285/355 |
| 6,366,436 B1 * | 4/2002 | Maier | G01F 15/06 361/93.9 |
| 2010/0258331 A1* | 10/2010 | Dahlgren | G01D 11/24 174/50.54 |

OTHER PUBLICATIONS

Thomas, Shane, "International Search Report", PCT International Application No. PCT/US17/22815, The International Searching Authority, dated Jul. 26, 2017.

(Continued)

*Primary Examiner* — Timothy Thompson
*Assistant Examiner* — Charles Pizzuto
(74) *Attorney, Agent, or Firm* — Lindauer Law, PLLC

(57) ABSTRACT

A multiple chamber explosion proof device may be configured for use in extreme environments. The enclosure includes a plurality of chambers in which a first chamber may contain equipment and at least a second chamber may be configured with other equipment. Between each chamber is an explosion proof bulkhead with thread connections used to mitigate flame paths. Each bulkhead may include access ports to allow electrical and network connections to be passed through the bulkheads. The wiring may be explosion proof. A cap for the terminal end includes threads to be secured to second bulkhead or another bulkhead and seal the enclosure. When the cap is removed, access to electrical connections for the device is provided.

20 Claims, 9 Drawing Sheets

(56) References Cited

OTHER PUBLICATIONS

Thomas, Shane, "Written Opinion of the ISA", PCT International Application No. PCT/US17/22815, The International Searching Authority, dated Jul. 26, 2017.

* cited by examiner

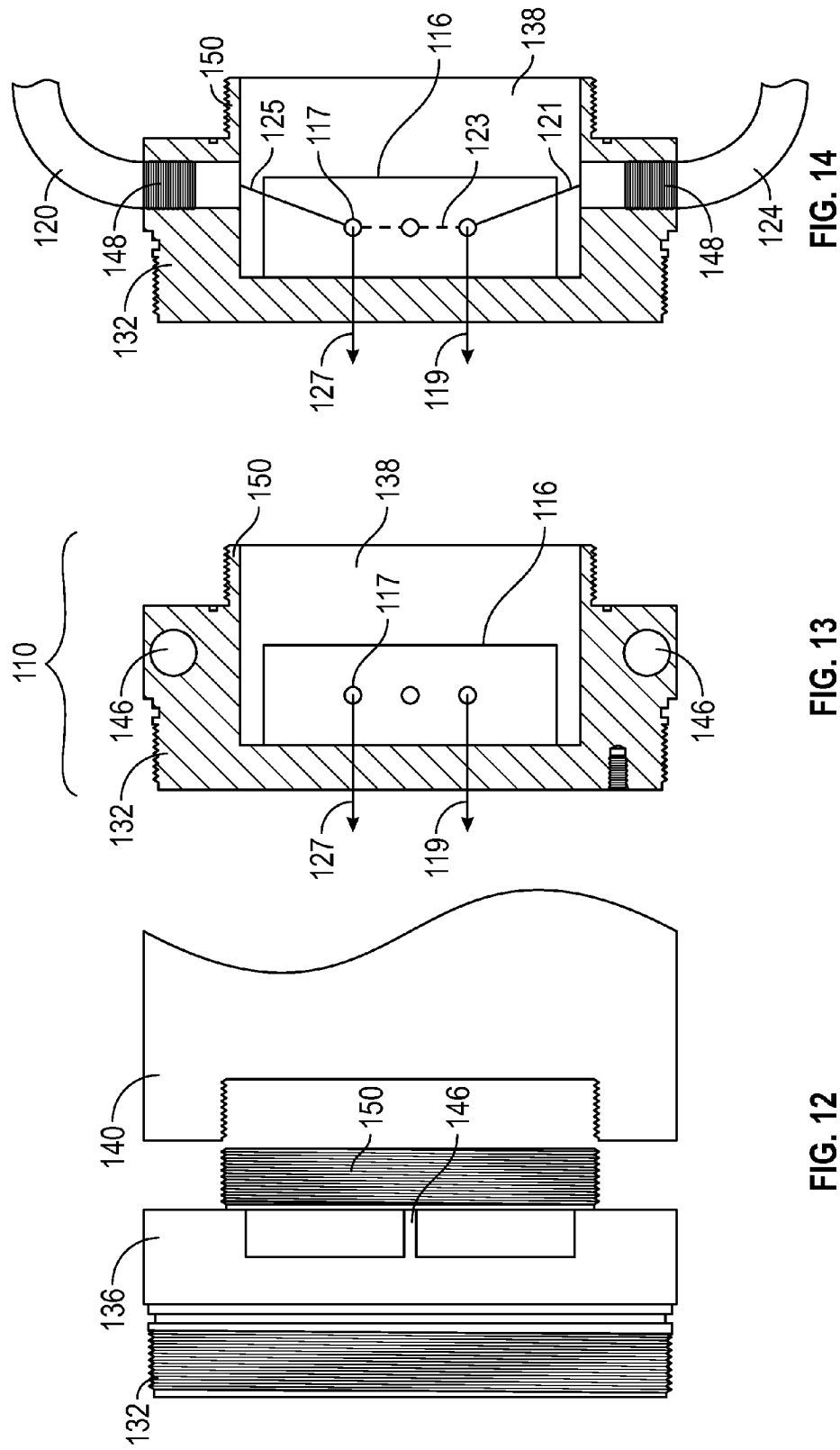

MULTIPLE EXPLOSION PROOF CHAMBERS DEVICE AND METHOD

BACKGROUND OF THE INVENTION

Field of the Invention

The present invention relates generally to explosion proof chambers and, more specifically, to a multiple explosion proof chamber enclosure. In one embodiment, the enclosure is uniform constructed with an integrated junction box milled directly to the housing. The enclosure includes a plurality of chambers in which a first chamber containing camera equipment or the like and at least a second chamber may be configured with an integrated junction box.

Background of the Invention

Robust enclosures are often used in areas in which it is paramount for the enclosures to operate under extreme weather conditions and in hazardous environments. The housing should be able to protect against rain, dust, corrosion, and the like. Such enclosures are especially suitable for monitoring wide open indoor or outdoor spaces such as refineries, wellheads, pipelines, offshore installations, remote, pharmaceuticals, manufacturing facilities, agriculture, and harsh locations where high-level reliability and precision are always required.

An explosion proof enclosure may be used in potentially hazardous areas where there is a risk of explosion because flammable gases, vapors, mists or dusts may be present. The housing should be designed to prevent explosion by containing any heat, sparks, or flames generated. This prevents ignition of potentially explosive atmospheres or materials outside the equipment.

Prior art explosion proof enclosures are known in the art. Such systems include a polymer or metal housing with a single compartment to contain camera systems. A junction box is necessary to provide power or other connections to the system in order to operate. However, prior art junction boxes are separate and external to the explosion proof system. These junction boxes must be installed externally to the explosion proof housing. Therefore, the explosion proof housing must be equipped with a wire fed through the wall in which wires must be passed through the housing to connect to the interior equipment and provide power or other necessary connections. A risk of mismatched components is introduced, such as cabling and separate HAZ rated junction boxes.

Additionally, prior art devices may have junction boxes made of less robust material, such as plastic, that would not be able to meet the required HAZ ratings in all environments. This also poses a danger should anything fall on top of the housing and crack the plastic junction box thereby exposing the internal power components in an explosive environment. Also, these systems do not include a secondary means to attach the system in case the main bracket fails. Therefore, an additional safety net is often required to be mounted under the camera. The net may obstruct a camera view or other equipment from operating correctly. Requiring additional equipment, in turn, increases installation time and costs.

In order to perform maintenance or alter the configurations of the equipment, prior art enclosures include a single chamber which must first be opened. To open the chamber, an end cap is attached using multiple screws wherein a problem of needing additional tools and the possibility of losing these screws often occurs. Furthermore, by opening the chamber, this may disturb the equipment or conditions inside the enclosure such as pressurization and cause condensation inside the enclosure. Fogging inside a camera enclosure may result in less than optimal performance. To maintain the system, therefore, also causes a need for extra equipment, increases installation time, increases labor expenses, and decreases safety by increasing the potential for mismatched HAZ rated components.

There exists a need for an explosion proof system that addresses the problems discussed hereinbefore. Consequently, those skilled in the art will appreciate the present invention.

SUMMARY OF THE INVENTION

One possible object of the present invention is to provide a multiple chamber explosion proof housing comprising an integrated junction box milled directly to the housing.

Another possible object of the present invention is to provide an explosion proof housing comprising at least two explosion proof chambers wherein each respective chamber is explosion proof although other embodiments include at least three chambers. As used herein an explosion proof chamber is a chamber separated by threaded connections that comprise flame paths.

Yet another possible object of the present invention is to provide explosion proof bulkheads separating the plurality of chambers with the threaded connections wherein modifications or maintenance to one chamber does not disturb any separate chambers.

A further possible object of the present invention is to provide explosion proof access points for external access to electrical connectors contained within an explosion proof chamber so that connections are made within an explosion proof chamber.

Another possible object of the present invention is to provide each respective bulkhead with threads with a flame path that reduces heat from an explosion within the housing to cool any gas that may escape thereby mitigating an external explosion with—any flame paths. As used herein, an explosion proof chamber is one that is separated from another explosion proof chamber by a threaded connection.

Yet still another possible object of the present invention is to provide integrated secondary fall protection which may also be operable as alternate mounting brackets of the apparatus.

Yet another possible object of the present invention is to provide a cover or cap for the junction box which comprises threads to allow installation and accessibility to internal components, as well as, to allow for a plurality of additional explosion proof chambers to mount together.

In one embodiment, the multiple explosion proof chambers device includes, but is not limited to a first explosion proof compartment, a bulkhead at one side of the first explosion proof compartment, and a second explosion proof compartment on an opposite side of the bulkhead from the first explosion proof compartment. In one embodiment, the invention may be implemented as a camera housing that allows for a camera or other equipment in the first explosion proof compartment and a junction box for wiring the camera or other equipment to a system in a second explosion proof compartment. Thus, wiring connections are made in a built in explosion proof compartment, which would be at least a third explosion proof chamber although other explosion proof chambers may also be utilized.

In one embodiment, a bulkhead is utilized to separates explosion proof compartments and may be solid except for openings for wiring that extends through the bulkhead between the two compartments but may also be open but comprising threads with flame paths. One presently preferred but non-limiting embodiment uses an opening or access point for wiring and may include other access points or openings to purge one or more explosion proof chambers. Each of these openings through the solid bulkhead is equipped with flame paths. Plugs used to seal openings through a bulkhead serve as flame paths. In one presently preferred embodiment, the plug, not the wire, serves as the flame path.

In one embodiment, one bulkhead is a solid metal component between two explosion proof compartments except for the openings for the wiring. The wiring may be explosion proof to allow for a flame path, e.g., through the insulation, and except for the wiring, which is sealed into the openings, the openings can be sealed.

In one embodiment, a bulkhead and a junction box are machined from a single piece of metal so as to be monolithically constructed. Integrated brackets for failsafe protection methods may also be machined into this component. Accordingly, in one embodiment the bulkhead and an explosion proof chamber for the junction box are machined into a monolithic component. The bulkhead, junction box, threads for a cap, access points and a junction box are referred to as an integrated component herein and also provides a threaded connection for a cap. The cap when removed allows access to the junction box and when in place provides that the junction box is within an explosion proof chamber.

The first explosion proof compartment may or may not comprise a transparent material so that the device could be used for other purposes than for a camera.

In one embodiment, the transparent material is dome shaped. In another embodiment, the transparent material is flat.

The explosion proof device may further comprise explosion proof electrical connections between the first explosion proof compartment and the second explosion proof compartment.

The device may further comprise the bulkhead comprising a metal housing, with at least one integrated bracket machined into the metal housing operable for connection. In one embodiment, the mount comprises an opening operable for connection to a cable to provide secondary fall protection.

In another embodiment, the explosion proof device further comprises a camera powered by network cables or other cables.

In another embodiment, the multiple explosion proof chamber device further comprises an explosion proof chamber, a cap, and an integrated component comprising the bulkhead and a junction box explosion proof chamber, threads with flame paths for connecting to the cap, access points machined into the bulkhead, wherein once the cap is in place the junction box explosion proof chamber is formed.

In one embodiment, the explosion proof device may comprise a cap for the integrated component and a threaded connection between the cap and the integrated component comprising flame paths. For example, the integrated component may include a bulkhead and a wiring junction box with connections for wiring to an electronic component, where the threaded cap is used to close off the wiring junction box. In one embodiment external wiring enters the junction box through a threaded connection access point machined into the bulkhead. The wiring would extend through the junction box and may comprise explosion proof wiring. Multiple access points may be utilized to daisy chain multiple explosion proof devices with cameras or other electronic equipment. It will be understood that conduit may also be utilized to connect multiple devices in series with wiring inside the conduit.

In one embodiment, the explosion proof device may further comprise a cylinder connectable to the integrated component and a second bulkhead connectable to the second cylinder.

In another embodiment, the explosion proof device may further comprise a third cylinder connectable to the second bulkhead and selectively a third bulkhead connectable to the third cylinder. Additional bulkheads and explosion proof compartments could be added.

One general aspect includes an explosion proof device including: an explosion proof chamber; a bulkhead on one side of said explosion proof chamber; a cap including a cap threaded connection for connecting to the bulkhead, the cap threaded connection including a flame path, the cap allowing access to the explosion proof chamber when the cap is removed by rotation. The explosion proof device also includes a junction box formed within the bulkhead, the junction box including wiring connections, the junction box being formed within the explosion proof chamber or within another explosion proof chamber.

Implementations may include one or more of the following features. The explosion proof device where the junction box is machined into the bulkhead. The explosion proof device further including a retainer to retain the cap in position when the cap is threadably secured to the bulkhead. The explosion proof device further including an access point machined into the bulkhead, the access point including an access point threaded connection through which an external cable enters the junction box for connection with the wiring connections. The explosion proof device further including a plurality of access points machined into the bulkhead. The explosion proof device where the plurality of access points permit connection between a plurality of explosion proof devices. The explosion proof device where the access point threaded connection includes a flame path. The explosion proof device including three explosion proof chambers where each of the three explosion proof chambers are separated by a threaded connection including a flame path. The explosion proof device further including a first explosion proof chamber including at least one of a transparent material, a translucent material, or an opaque material. The explosion proof device further including the first explosion proof chamber is at least one of a dome shape, a flat shape, or another shape. The explosion proof device where the bulkhead includes a secondary fall protection element machined into the bulkhead, the secondary fall protection element includes an opening operable for connection to a cable to provide secondary fall protection. The explosion proof device further including a cap including a threaded connection for connecting to the bulkhead, the threaded connection including a flame path. The explosion proof chamber where the cap allowing access to a junction box when the cap is removed by rotation, the junction box being formed within the explosion proof chamber or within another explosion proof chamber. The explosion proof device including at least three explosion proof chambers where each of the at least three explosion proof chambers are separated by a threaded connection including a flame path. The explosion proof device further including an access point machined into the bulkhead, the access point including an access point threaded connection through which an external cable enters a junction box for connection with a wiring connection, the wiring connection being within the explosion proof chamber or another explosion proof chamber. The explosion proof device further including a plurality of access points machined into the bulkhead, the plurality of access points permit connection between a plurality of explosion proof devices, where each of the plurality of access points including a threaded connection that includes a flame path. A method for making or using an explosion proof device, including: providing a first explosion proof chamber. The method includes providing a first bulkhead at one side of the first explosion proof chamber. The method includes providing a second explosion proof chamber on an opposite side of the first bulkhead from the first explosion proof chamber. The method includes providing a third explosion proof chamber, where each of the first explosion proof chamber, the second explosion proof chamber, and the third explosion proof chamber are separated by a threaded connection including a flame path; providing a cap including a cap threaded connection for connecting to a bulkhead, providing that the cap threaded connection includes a flame path. The method includes providing that the cap allows access to a junction box when the cap is removed by rotation, the junction box being formed within the third explosion proof chamber or within another explosion proof chamber.

One general aspect includes an explosion proof device including: an explosion proof chamber; a bulkhead on one side of the explosion proof chamber; and an integrated secondary fall protection element machined into the explosion proof device, where the integrated secondary fall protection element includes an opening operable for connection to a cable to provide secondary fall protection. Implementations may include one or more of the following features. The explosion proof device further including a cap including a threaded connection for connecting to the bulkhead, the threaded connection including a flame path. The explosion proof chamber where the cap allowing access to a junction box when the cap is removed by rotation, the junction box being formed within the explosion proof chamber or within another explosion proof chamber. The explosion proof device including at least three explosion proof chambers where each of the at least three explosion proof chambers are separated by a threaded connection including a flame path. The explosion proof device further including an access point machined into the bulkhead, the access point including an access point threaded connection through which an external cable enters a junction box for connection with a wiring connection, the wiring connection being within the explosion proof chamber or another explosion proof chamber. The explosion proof device further including a plurality of access points machined into the bulkhead, the plurality of access points permit connection between a plurality of explosion proof devices, where each of the plurality of access points including a threaded connection that includes a flame path. A method for making or using an explosion proof device, including: providing a first explosion proof chamber. The method includes providing a first bulkhead at one side of the first explosion proof chamber. The method includes providing a second explosion proof chamber on an opposite side of the first bulkhead from the first explosion proof chamber. The method includes providing a third explosion proof chamber, where each of the first explosion proof chamber, the second explosion proof chamber, and the third explosion proof chamber are separated by a threaded connection including a flame path; providing a cap including a cap threaded connection for connecting to a bulkhead, providing that the cap threaded connection includes a flame path. The method includes providing that the cap allows access to a junction box when the cap is removed by rotation, the junction box being formed within the third explosion proof chamber or within another explosion proof chamber. Implementations of the described techniques may include hardware, a method or process, or computer software on a computer-accessible medium.

Implementations may include one or more of the following features. A method for making or using an explosion proof device, including: providing a first explosion proof chamber. The method includes providing a first bulkhead at one side of the first explosion proof chamber. The method includes providing a second explosion proof chamber on an opposite side of the first bulkhead from the first explosion proof chamber. The method includes providing a third explosion proof chamber, where each of the first explosion proof chamber, the second explosion proof chamber, and the third explosion proof chamber are separated by a threaded connection including a flame path; providing a cap including a cap threaded connection for connecting to a bulkhead, providing that the cap threaded connection includes a flame path. The method includes providing that the cap allows access to a junction box when the cap is removed by rotation, the junction box being formed within the third explosion proof chamber or within another explosion proof chamber.

These and other objects, features, and advantages of the present invention will become more clear from the figures and description given hereinafter. It is understood that the objects listed above are not all inclusive and are only intended to aid in understanding the present invention, not to limit the bounds of the present invention in any way.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

FIG. 12 is a side view of a bulkhead for a multiple explosion proof chambers device in accordance with one embodiment of the present invention.

FIG. 13 is a side view in section of a bulkhead for a multiple explosion proof chambers device in accordance with one embodiment of the present invention.

FIG. 14 is a side view in section of a bulkhead for a multiple explosion proof chambers device in accordance with one embodiment of the present invention.

DETAILED DESCRIPTION OF THE DRAWINGS

Detailed descriptions of embodiments of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
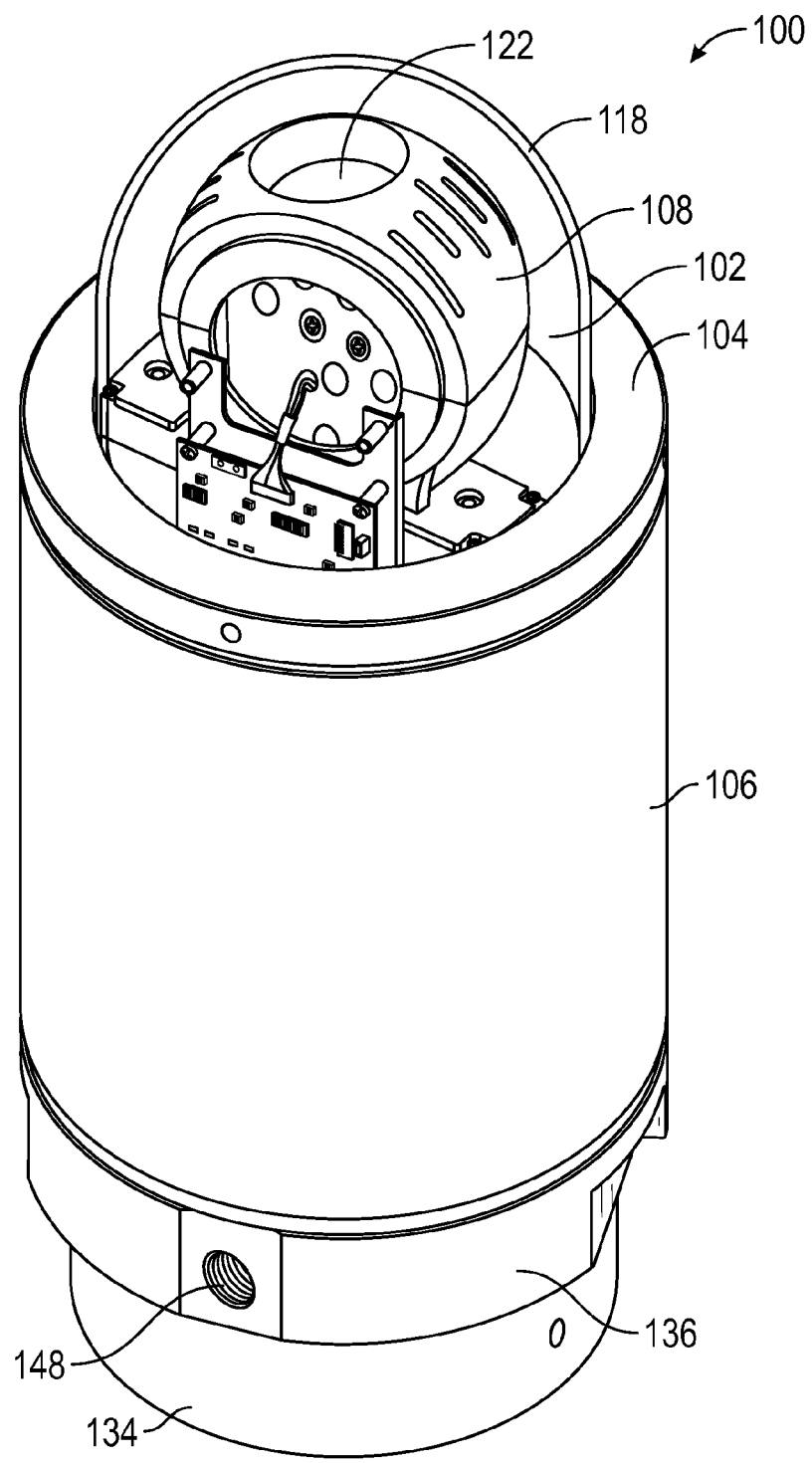
FIG. 1 is a top perspective view of a multiple explosion proof chambers device in accordance with one embodiment of the present invention.

Referring to FIG. 1 and FIG. 13, multiple explosion proof chamber device 100 is shown as a generally elongated metallic cylinder comprising a first explosion proof chamber 102, also referred to as first explosion proof compartment or cylinder, second explosion proof chamber 106, and a cover or cap 134 for integrated component 110 as shown in FIG. 13, which may contain an integrated junction box 116 that is machined into a bulkhead. Multiple explosion proof chamber device 100 is hazardous rated for Class I & II, Division 1, ATEX & IECEx Zone 1 and Zone 21. Multiple explosion proof chamber device 100 preferably is constructed of an anodized aluminum housing to protect the interior components against rain, dust, corrosion, and the like. Heating and cooling devices can be utilized to extend the range of components utilized in an explosion proof chamber. This ensures operation under extreme weather conditions and hazardous environments. Other robust lightweight materials may also be used consistent with the teachings herein. Multiple explosion proof chamber device 100 is especially suited for monitoring wide open indoor and outdoor spaces such as refineries, wellheads, pipelines, offshore installations, pharmaceuticals, manufacturing facilities, agriculture, remote and other harsh locations where high-level reliability and precision is always required. Explosion proof chamber device 100 is non-limiting and may comprise more chambers than the three explosion proof chamber device shown or could conceivably comprise fewer chambers.

In one possible non-limiting embodiment, first explosion proof chamber 102 may house camera 122 and camera housing 108. The camera 122 may be a PTZ, or pan, tilt, zoom, camera offering optimal range of motion to survey a wide area with 360 degree rotation in both directions as well as pan and tilt motion. A plurality of other desired components may be used such as a spotlight, rain gauge, radiation detector, Doppler radar, Infrared (IR), radar unit, communication devices, and/or other like desired sensors or components. It will be understood that other types of sensors or detectors could also be used such as smoke, fire, $CO_2$ detectors, temperature, wind speed, rain, gas, pollution, radiation, and the like so that motion detectors refers to other types of detectors which could produce information viewed by a particular camera. As well, many types of motion sensor detectors could be used such as radar, thermal, magnetic, ultrasonic or the like.

First explosion proof chamber 102 may comprise a transparent material 118. Transparent material 118 may be dome shaped, flat, or any other desired shape. Transparent material 118 may in one non-limiting embodiment be constructed of a clear material able to protect camera 122 against rain, dust, and corrosion, and the like. However, opaque or translucent materials may also be used with devices other than optical recognition devices because they perform without the need for a clear material. Examples include IR camera, radar, and the like. Transparent material 118 comprises a housing that is weather proof. In one embodiment, first explosion proof chamber 102 is not individually pressurized from 106 through the first bulkhead 104. In this case, first bulkhead 104 connects the transparent dome 118 to the second explosion proof chamber 106 through threaded connections with flame paths. The chambers 102 and 106 are then at the same pressure but could be at different pressures. Once cap 134 is secured to second bulkhead 136, then cavity 138 serves as a third explosion proof chamber or which may also be referred to herein as another explosion proof chamber as shown in more detail in FIGS. 13 and 14.

Figure 2:
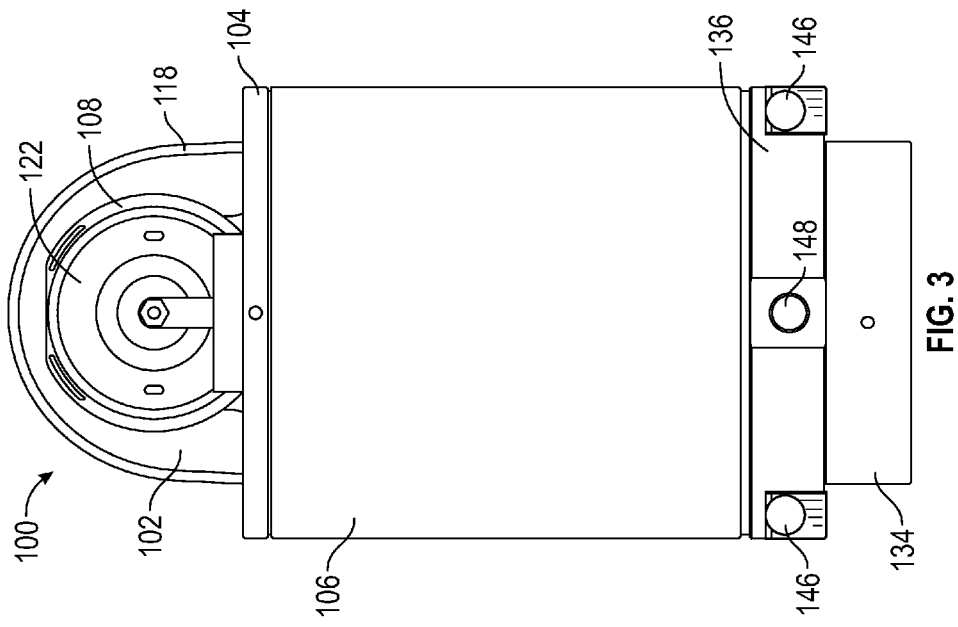
FIG. 2 is a front elevational view of a multiple explosion proof chambers device in accordance with one embodiment of the present invention.
Figure 3:
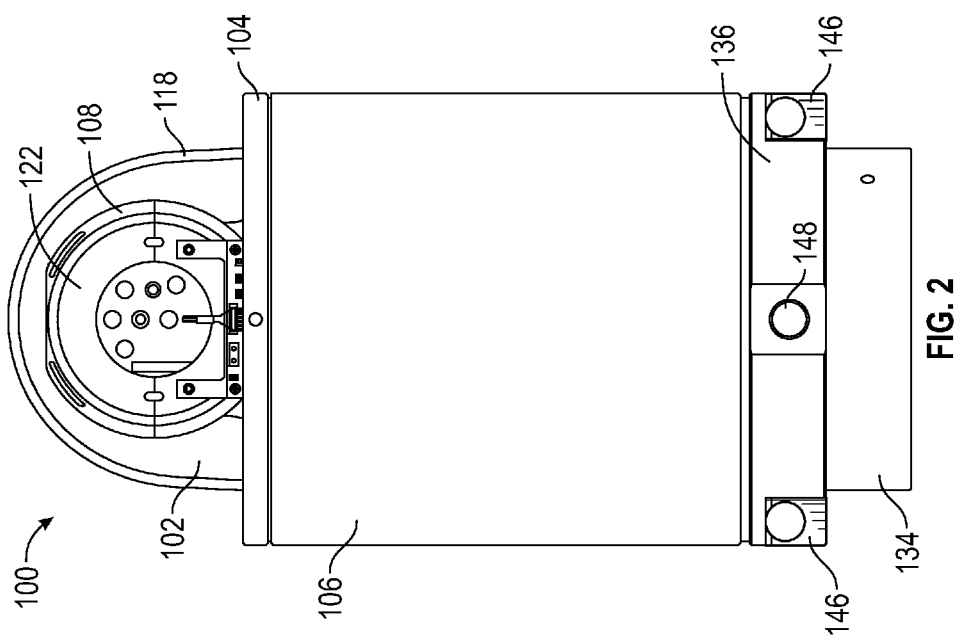
FIG. 3 is a rear elevational view of a multiple explosion proof chambers device in accordance with one embodiment of the present invention.
Figure 4:
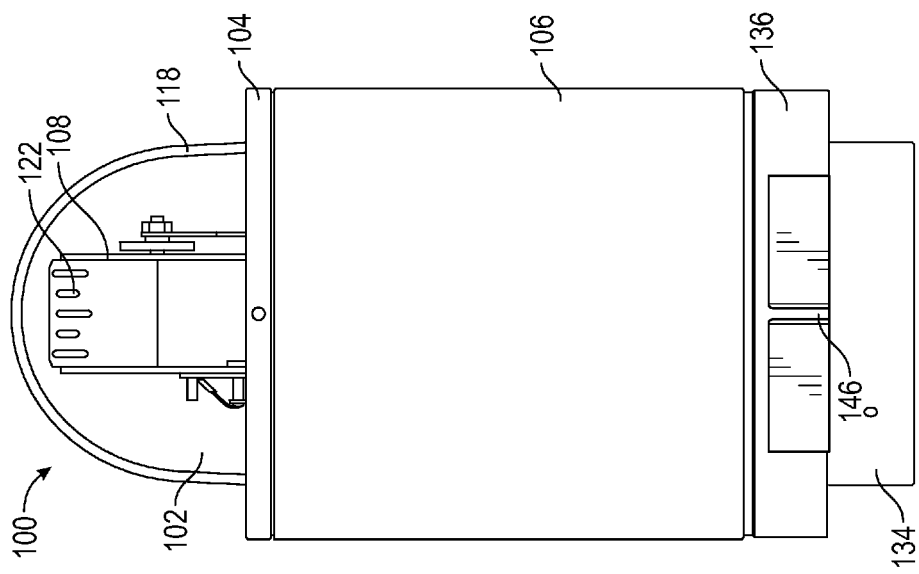
FIG. 4 is a right side elevational view of a multiple explosion proof chambers device in accordance with one embodiment of the present invention.
Figure 5:
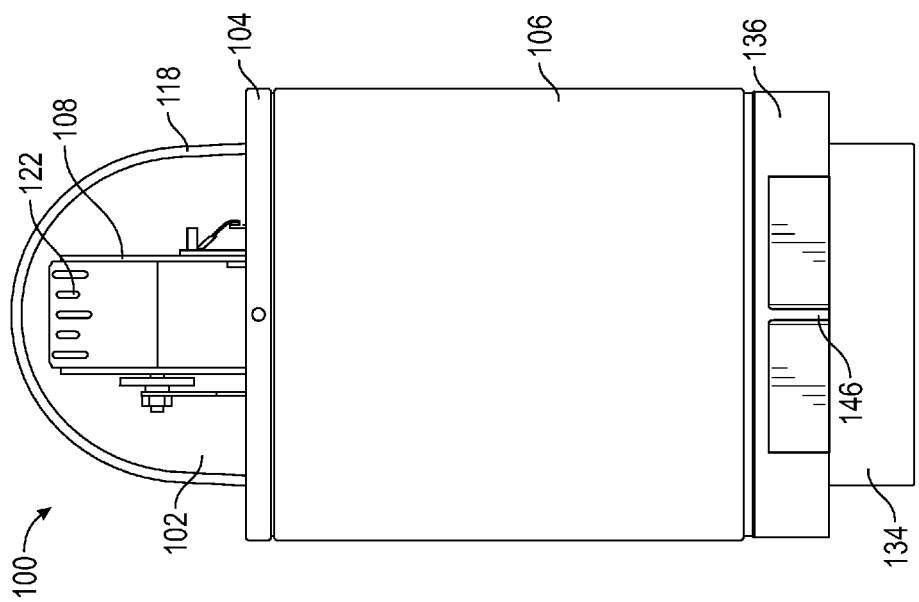
FIG. 5 is a left side elevational view of a multiple explosion proof chambers device in accordance with one embodiment of the present invention.

At the end of first explosion proof chamber 102 is first bulkhead 104. First bulkhead 104 may be constructed from metal or plastic. First bulkhead 104 attaches first explosion proof chamber 102 and second explosion proof chamber 106. In one embodiment, first explosion proof chamber 102 and second explosion proof chamber 106 may be open to each other. First bulkhead 104 comprises threads with flame paths thereby protecting each respective chamber with flame paths through first bulkhead 104. Second explosion proof chamber 106 may contain a plurality of components such as wireless routers, processors for running analytics, battery supplies, data storage, wireless access points, or the like. Second bulkhead 136 is connectable by a threaded connection to second explosion proof chamber 106 at the opposite end as first bulkhead 104. Second bulkhead 136 also is explosion proof and seals the respective end of second explosion proof chamber 106 with thread connections comprising flame paths. Flame paths are the machined threads to adapt the screw method of connecting bulkheads with chambers. Additionally, second bulkhead 136 contains integrated junction box 116 (See FIG. 13) milled directly into second bulkhead 136. While second bulkhead 136 is shown as an example, preferably a terminal bulkhead like second bulkhead 136 would be utilized that provides threads for connection to cap 134, with electrical connectors 117 provided therein within an explosion proof chamber once cap 134 is connected. Second bulkhead 136, integrated junction box 116, and/or secondary fall protection element 146, see FIG. 2 or 3, are machined into second bulkhead 136 to provide a monolithic component, which may be referred to as an integrated component 110 herein, which forms a third explosion proof chamber. Integrated junction box 116, see FIG. 13, can be used to make wiring connections for connection utilizing wiring 119, which may also represent multiple wires and connections to other explosion proof chambers. Once cap 134 is screwed onto second bulkhead 136, integrated junction box 116 is then within an explosion proof chamber, which may be referred to as another explosion proof chamber, a third explosion proof chamber in the present embodiment or a terminal explosion proof chamber on one end of the explosion proof device 100. The openings in secondary fall protection elements may also be used as metal mounts as a possible mounting option but that is not the preferred method. Preferably the openings allow connection to a cable that provides the secondary fall protection feature.

As shown in FIG. 14, second bulkhead 136 or possibly another bulkhead, comprises an access point 148 to terminal cavity 138, which is a threaded connection on adapter 150 wherein the threads comprise a flame path. When the cap is secured to the second bulkhead then another explosion proof chamber is formed which may also be referred to as a third explosion proof chamber in the embodiment of FIG. 1 or a terminal explosion proof chamber at one end of the explosion proof device 100 if additional explosion proof chambers 140 are utilized. If expansion chambers 140 are utilized then the cap is secured to the terminal explosion proof chamber. The access point 148 to terminal cavity allows the insertion of network or power cables 124 and explosion proof electrical connections such as cables or conduit 120 to connect to the integrated junction box 116 within second explosion proof chamber 106. Another possible embodiment may comprise a plurality of access points 148 as shown in FIG. 14. Cables 120 and 124 may or may not be the same type of cable. For example, cable 120 may provide an input to a first camera and cable 124 provides an output that goes to a second camera in another explosion proof device, which could have the same configuration leading to a third camera and so forth.

One or more of possible internal wiring 119, 121, 123, 125, 127 and/or other wiring may or may not be utilized with the electrical connections 117 as desired. Any arrangement of connection of wiring within an explosion proof chamber is possible in accord with the present invention. Wiring 119 and 127 connecting to other electronic devices in other explosion proof chambers through bulkhead access ports 114 is representative only and may include use of more wires or fewer. Wiring may refer to any number of wires or cables.

For example, one or several wires may be utilized for wiring 119 to other explosion proof chambers with wiring 127 not being used. In other words, 119 represents any number of cables/wires leading to other explosion proof chambers, which may be directed through bulkhead access ports 114 as discussed previously. Likewise, one or more wires/cables for wiring 127 may or may not be used to connect to other explosion proof chambers through bulkhead access ports 114.

One of the access ports 148 may be plugged if not used. Alternatively, cable 120 may be utilized to connect additional cameras which can be easily added to a hazardous area should an operator decide to have multiple cameras in multiple explosion proof chambers. For example, dashed wiring 123 might be utilized to connect to cable 120 from wiring 121 via wiring 125. Alternatively, wiring 127 through bulkhead access ports 114 might be utilized to provide cables/wiring for other cameras or devices connected via cable 120. There are numerous possibilities for connections. Additional cameras could be installed at the same time or could be installed later whenever desired.

One of the access ports 148 can also be initially plugged. When desired to add new cameras, the appropriate connections may be made. Additional cameras can be added at any time by taking the plug out and running wiring to the addition cameras. Providing access ports 148 to junction box 116 on second bulkhead 136 allows daisy chaining multiple cameras from a single camera to avoid the need to utilize an electrician with specialized knowledge to come out each time a camera is added. If additional explosion proof chambers are utilized with a plurality of bulkheads then other bulkheads rather than second bulkhead may be utilized with a junction box with electrical connections.

Referring again to FIG. 1, 2, 3 and other figures, at the base of multiple explosion proof chamber device 100 is a cover or cap 134 for the integrated component 110. Cap 134 is preferably comprised of anodized aluminum and constructed of the same material as second explosion proof chamber 106. Cap 134 comprises a threaded portion wherein cap 134 screws on the base of integrated component 110, which includes second bulkhead 136 so that there is access to the internal components. By using a cap threaded connection to attach cap 134 to second bulkhead 136, this eliminates the potential for losing screws or needing additional tools when removing cap 134. It will be noted that additional chambers could be added so that integrated component 110 may be formed as a bulkhead and connected to the explosion proof chamber device 100 other than the specific second bulkhead.

Figure 11:
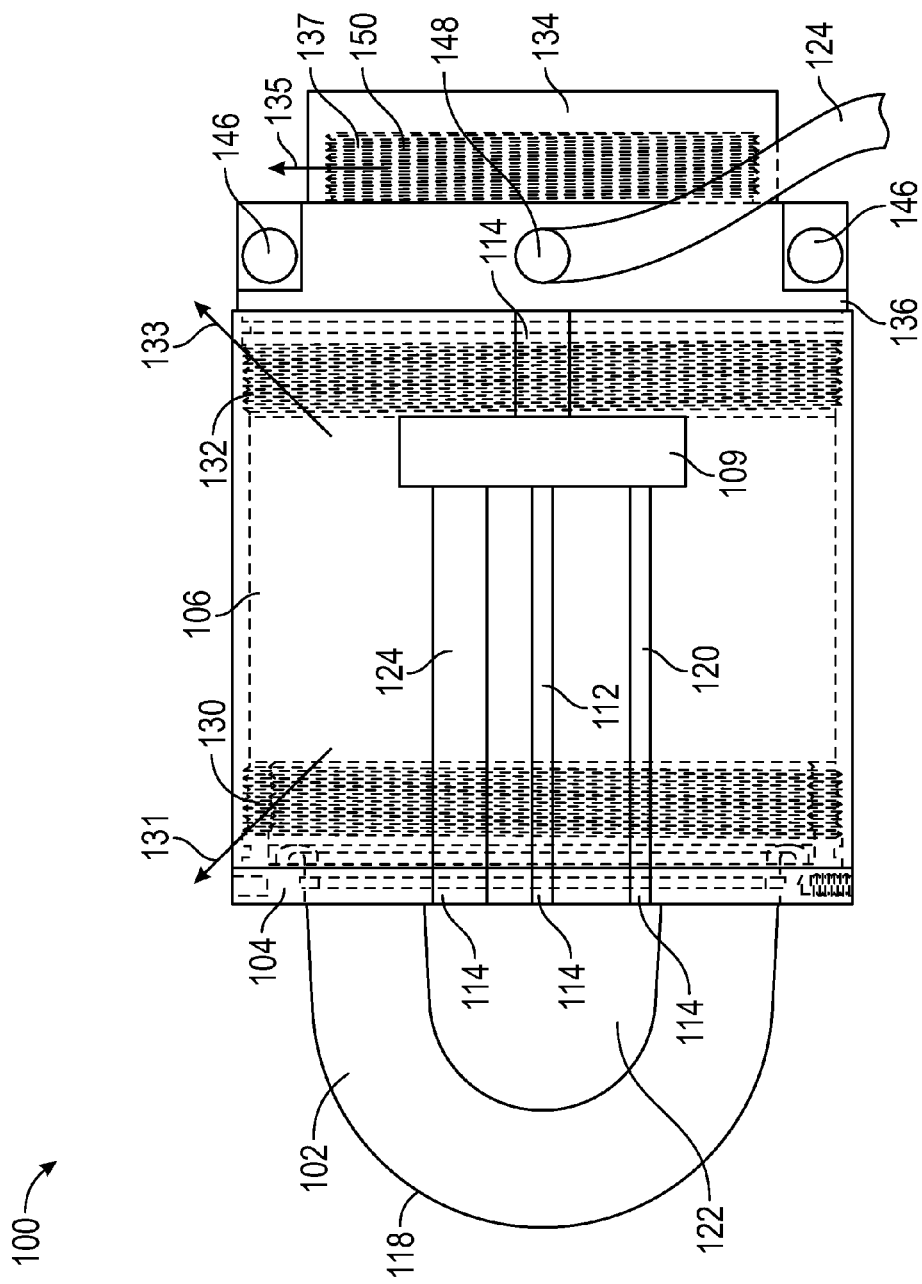
FIG. 11 is a side view of a multiple explosion proof chambers device showing internal components in accordance with one embodiment of the present invention.

Referring to FIGS. 2-5, respectively, front, rear, right and left elevational views of multiple explosion proof chamber device 100 are shown in accordance with one embodiment of the present invention. Multiple explosion proof chamber device 100 comprises first explosion proof chamber 102, first bulkhead 104, second explosion proof chamber 106, second bulkhead 136, and cap 134. As used herein, an explosion proof chamber is separated by a bulkhead containing flame paths as shown in FIG. 11. In one possible embodiment, first explosion proof chamber 102 is comprised of transparent material 118 in a dome shape, although other shapes are also possible. Housed within transparent material 118 is camera housing 108 which could possibly contain camera 122 therein. First bulkhead 104 and second bulkhead 136 are mounted respectively on opposite sides top and bottom of second explosion proof chamber 106. Second bulkhead 136 further comprises access point 148 and integrated secondary fall protection element 146, which may also be referred to as alternate mount or retention ring 146. Integrated secondary fall protection element 146 is a set of predrilled holes in the housing of multiple explosion proof chamber device 100 that may be utilized for mounting a fall protection lanyard or other cabling so as to protect multiple explosion proof chamber device 100 from damage in the event a mount fails causing a fall of the multiple explosion proof chamber device 100 and even more importantly provide safety to personnel below should the camera fall. Integrated secondary fall protection element 146 may also be used as an alternate mounting bracket that may be more conveniently used in some applications. Having an integrated secondary fall protection element 146, as opposed to a safety net mounted under the system, offers an unobstructed view while also decreasing installation time and costs.

Figure 6:
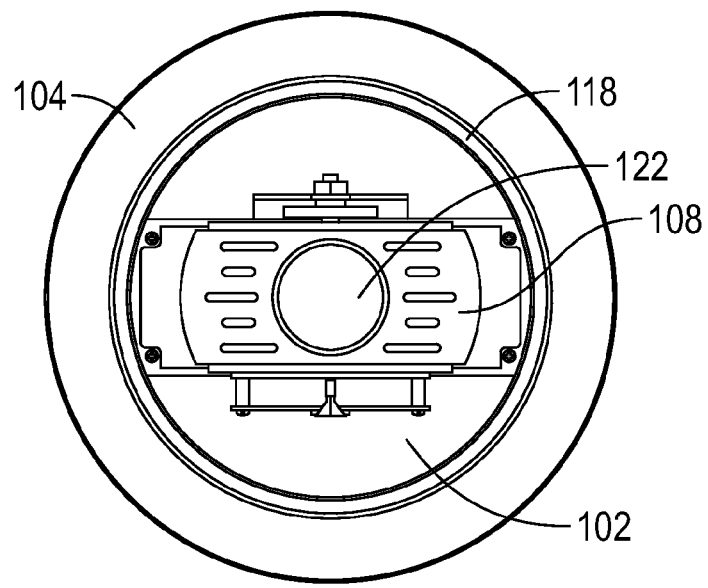
FIG. 6 is a top plan view of a multiple explosion proof chambers device in accordance with one embodiment of the present invention.

Referring to FIG. 6, a top plan view of a multiple explosion proof chamber device 100 is shown in accordance with one embodiment of the present invention. In one possible embodiment, first explosion proof chamber 102 comprises transparent material 118 which may be dome shaped. Transparent material 118 may be a plurality of other desired shapes such as dome shaped, flat, round, cylindrical, other any other desired shape. Within transparent material 118, camera housing 108 is mounted to first bulkhead 104.

Camera 122 may comprise a PTZ camera as discussed previously. First explosion proof chamber 102 can accommodate a plurality of various manufacturer cameras or other devices chosen by user for the desired application. First bulkhead 104 is explosion proof in that there is a threaded connection with flame paths that separates first explosion proof chamber 102 from second explosion proof chamber 106. In one embodiment, second explosion proof chamber 106 is configured to accept mounting of a plurality of devices discussed hereinbefore.

Figure 7:
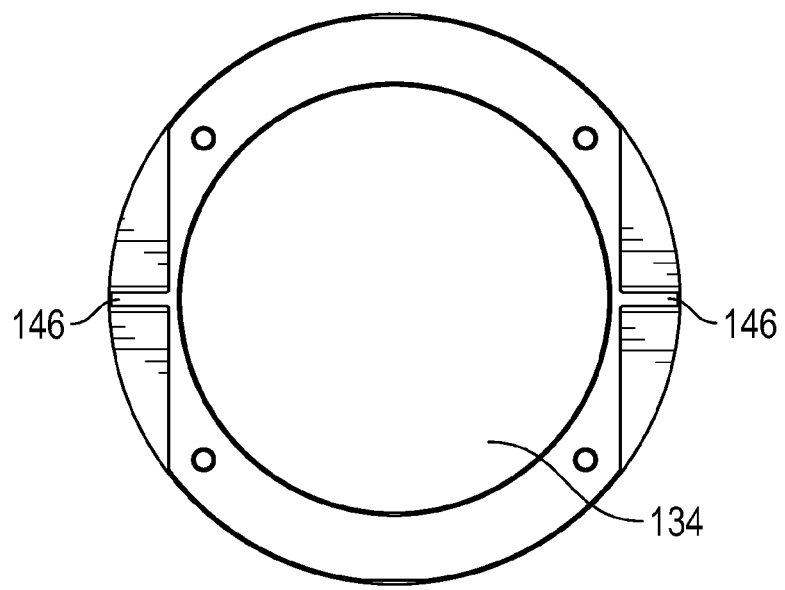
FIG. 7 is a bottom plan view of a multiple explosion proof chambers device in accordance with one embodiment of the present invention.

Referring to FIG. 7, a bottom plan view of a multiple explosion proof chamber device 100 is shown in accordance with one embodiment of the present invention. Cap 134 is shown secured to second bulkhead 136. Cap 134 is constructed with threads to be secured with reciprocal threads on second bulkhead 136 where the threads comprise a flame path. Using threads allows for a more secure fit of cap 134 and eliminates the need for additional tools or the possibility of losing mounting screws. More importantly, the threads are flame paths which act to cool hot gas before it makes contact with the outside environment. Once cap 134 is mounted then a third explosion proof chamber is formed.

Cap 134 may be removed by rotation in order to gain access to the internal components. Cap 134 is preferably comprised of anodized aluminum and the same material as the external housing of multiple explosion proof chamber device 100. In a preferred embodiment, a metal construction is used, as opposed to plastic, to protect multiple explosion proof chamber device 100 from possible impacts from falling objects and provides for a more robust cap able to withstand harsher external environments. Integrated secondary fall protection element 146 is shown on the bottom of and on opposing sides of second bulkhead 136. Integrated secondary fall protection element 146 is milled directly into the housing of second bulkhead 136 and is comprised of the same material as second bulkhead 136. Secondary fall protection element 146 may also be used as alternate mounting brackets or retention rings thereby eliminating the need for additional expensive and view obtrusive safety nets. Secondary fall protection 146 is just that, an additional safety method of preventing the explosion proof device 100 from falling should the primary mounting structure fail. A wall or pole with wall mount may be utilized. The mount is secured by screws to the bottom of second bulkhead 136. This does not inhibit the unscrewing of cap 134. The secondary fall protection 146 is a second means of securing explosion proof device 100 to a structure.

Figure 8:
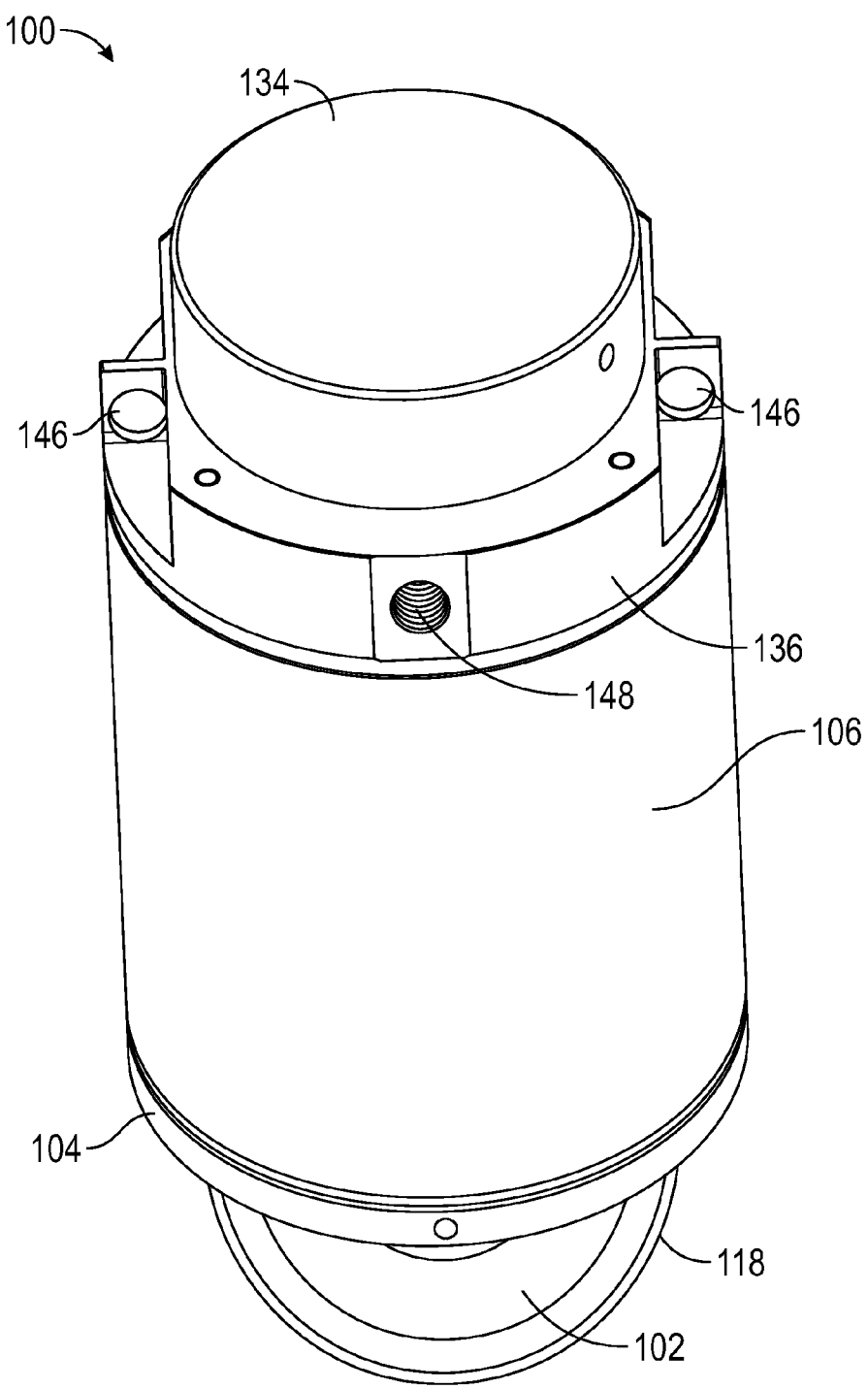
FIG. 8 is a bottom perspective view of a multiple explosion proof chambers device in accordance with one embodiment of the present invention.

Referring to FIG. 8, a bottom perspective view of a multiple explosion proof chamber device 100 is shown in accordance with one embodiment of the present invention. Cap 134 is secured to second bulkhead 136 via threaded connections. Secondary fall protection 146, are milled directly into second bulkhead 136 and are positioned on opposing sides of second bulkhead 136. Access point 148 is milled through second bulkhead 136 providing access to insert explosion proof electrical connections or external wiring 120, network cables 124, or other explosion proof wiring 112. Only one access point 148 is shown, however a plurality of access points 148 may be provided, one example of which is shown in FIG. 14. Second explosion proof chamber 106 is connected on respective opposite sides to second bulkhead 136 and first bulkhead 104. Mounted to first bulkhead 104 is first explosion proof chamber 102. First explosion proof chamber 102 may comprise transparent material 118. In one possible embodiment, transparent material 118 is dome shaped, however other desired shapes may be utilized.

Figure 10:
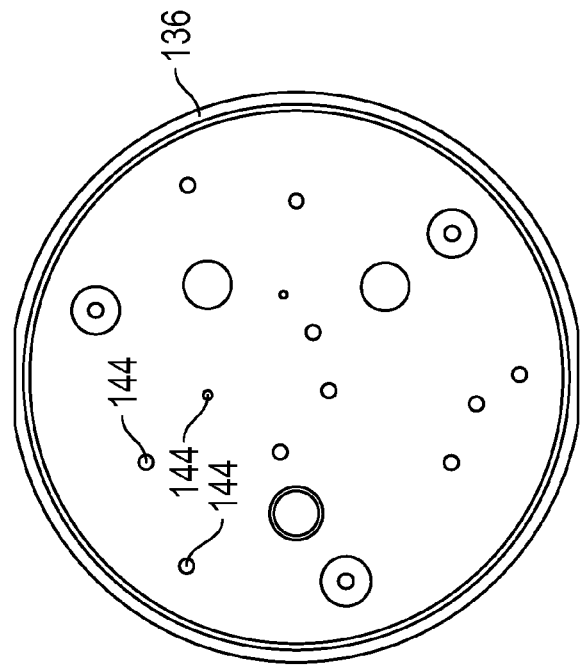
FIG. 10 is another bottom view of a multiple explosion proof chambers device bulkhead in accordance with one embodiment of the present invention.
Figure 9:
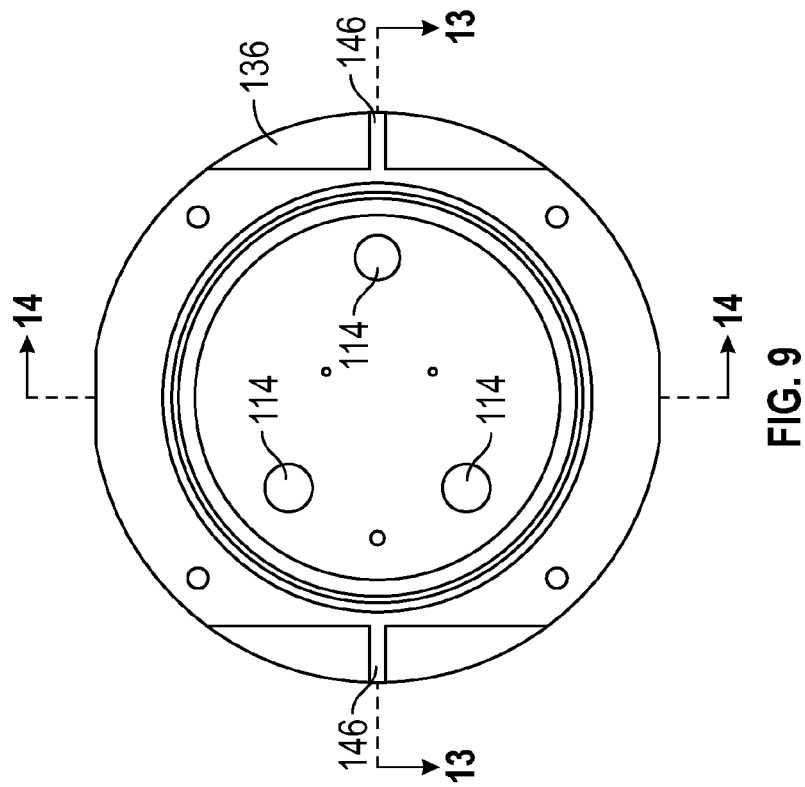
FIG. 9 is a bottom view of a multiple explosion proof chambers device bulkhead in accordance with one embodiment of the present invention.

Referring to FIG. 9, a bottom view of a multiple explosion proof chamber device 100 is shown. Second bulkhead 136 is made of a single construction wherein preferably integrated secondary fall protection element 146 is milled directly into second bulkhead 136. In one embodiment, two secondary fall protection elements 146 may be used, although a plurality of mounts be also be used. In FIG. 9, cap 134 is not shown for clarity. A plurality of bulkhead access ports 114, see FIG. 13, allow passage of explosion proof wiring 112, such as illustrative wiring 119 and 127 shown in FIG. 14, explosion proof electrical connections from external wiring 120, and/or external network cables 124 from one chamber to the next. Wiring is shown for illustrative purposes and is not intended to represent the many possible ways of wiring. Bulkhead access ports 114 also allow for purging a chamber. Referring to FIG. 10, another bottom view of a multiple explosion proof chamber device 100 is shown. Perforations 144 are holes that allow the attachment of various mounting brackets such as terminal strips for network and power cabling such as connectors 117 shown for illustration only in FIG. 14. As explained, the network components would be housed in chamber 106. Bulkheads 104 and 136 are different. Bulkhead 104 is simply a retaining method to attach the transparent dome 118 to the chamber 106 with threads comprising flame paths. This is a ring that may allow an opening from 118 to 106. In a preferred embodiment, ports 114 go through bulkhead 136 to provide electrical connections. In a preferred embodiment, perforations 144 do not go all the way through the bulkhead. The wiring may be explosion proof, which is sealed into the openings; the openings can be sealed by way of isolation barriers.

Referring to FIG. 11, a side view of a multiple explosion proof chamber device 100 is shown comprising first explosion proof chamber 102, first bulkhead 104, second explosion proof chamber 106, integrated component 110 (see FIG. 13), and cap 134. Integrated component 110 may be positioned elsewhere or may be utilized in other embodiments where another explosion proof chamber is added as discussed with regards to expansion explosion proof chamber or cylindrical housing 140 in FIG. 12. In one possible embodiment, first explosion proof chamber 102 further comprises transparent material 118 and camera 122. Transparent material 118 may be dome shaped to accept a digital PTZ camera 122 and offer optimal range of motion. Another embodiment may have a flat transparent material 118 or solid capsule. First bulkhead 104 is explosion proof and made of a single construction from metal or plastic. In one embodiment, camera 122 can be mounted to first bulkhead 104.

First bulkhead 104 includes first threaded connections 130 used to secure second explosion proof chamber 106 to first bulkhead 104 wherein second explosion proof chamber 106 includes reciprocal threading. Flame paths, as indicated by arrow 131, through threaded connection 130 are provided in the threaded connections to ensure the explosion proof nature of the second explosion proof chamber 106. On the opposite side of second explosion proof chamber 106 is second threaded connection 132 which secures second bulkhead 136 to second explosion proof chamber 106. Flame paths, as indicated by arrow 133, through threaded connection 130 are provided in the threaded connections to ensure the explosion proof nature of the second explosion proof chamber 106. All threads shown provide a utility of reducing the heat from an explosion within the housing to cool any gas that may escape thereby mitigating an external explosion with gases in the outside environment, which is the purpose of flame paths. Access ports 148 also comprise threaded connections with flame paths.

Second bulkhead 136 which is part of integrated component 110 is machined from a single piece of metal so as to be monolithically constructed. Integrated brackets may also be machined into this component. Accordingly, second bulkhead 136, integrated junction box 116, and/or secondary fall protection elements 146 are machined into a monolithic component, threads for the cap, bulkhead access ports 114 shown in FIG. 9, which is referred to as an integrated component 110 herein. Second bulkhead 136 further preferably comprises integrated secondary fall protection elements 146 and an access point 148 to terminal cavity 138. Cables 124, which may comprise power lines, network lines or any other desired electrical wiring, may be inserted into second bulkhead 136 through access points 148. Cap 134 covers the terminal cavity 138 and is also threaded with threads 137 comprising flame paths 135. Cap 134 could also selectively accept another explosion proof chamber connected to a plurality of bulkheads to add more devices.

Electronic device 109 in FIG. 11 may be an electronic component that is connected to wiring from external cable 124 as discussed and shown in FIGS. 13 and 14. In that case the junction box discussed in FIG. 13 may or may not be present.

FIGS. 12-14 show side views in section of second bulkhead 136 for a multiple explosion proof chamber device 100. Second bulkhead 136 comprises a threaded connection with flame paths on both sides 132, 150 and is made of a single construction. FIG. 12 shows second threaded connection 132 is milled into second bulkhead 136 for connection to a second chamber or another explosion proof chamber depending on the configuration. Second threaded connection 132 is operable as an adapter to receive a cylindrical housing 140 that would then comprise another explosion proof chamber. It may also be referred to as an expansion explosion proof chamber. Any number of explosion proof chambers may be added. It will be appreciated that housing 140 and other cylinders will comprise other threaded connections with flame paths. For example, another bulkhead could be utilized with threaded connections for connecting to cylindrical housing 140, which is connected using threads with flame paths as used in first bulkhead 104.

On the opposite side of second bulkhead 136 is adapter 150 to receive a cylindrical housing or cap 134, which is also a threaded connection milled directly into second bulkhead 136. Adapter 150 may be of any diameter. Additional explosion proof chambers may be secured using adapter 150. For example, as shown, expansion explosion proof chamber 140 may include reciprocal threading and be coupled to second bulkhead 136. Each respective bulkhead could contain bulkhead access ports 114 so that multiple entry points may be utilized for passing cabling through thereby a plurality of cameras or other equipment may be connected in series or "daisy-chained" together. However, in this example, first bulkhead 104 is open and may include mountings for a camera. It will be appreciated that multiple expansion chambers like expansion explosion proof chamber 140 may be utilized consistent with the teachings herein.

FIGS. 13 and 14 shows one possible embodiment comprising integrated component 110 with second bulkhead 136 in cross section. FIG. 13 is shown in cross section along line 13 in FIG. 9. The interior of second bulkhead 136 houses terminal cavity 138 wherein junction box 116 is located in terminal cavity 138. Within junction box 116, connectors 117 can be provided, which may include a terminal strip with more or fewer connections. The wiring is illustrative of any number of possible wiring connections that could be made within the third explosion proof chamber.

One or more of illustrative possible wiring 119, 121, 123, 125, 127 and the like may be utilized for connection with electronic components found in the first and second chambers or for connection to cable 120, if used. The wiring is representative only and may or may not utilize any individual wiring shown. Wiring 123 in dash represents possible wiring that may go out externally as wiring 120 from wiring 121 to other explosion proof devices that may contain cameras or the like as discussed herein. The term wiring may refer to any type of wiring or cables.

FIG. 14 also shows one possible embodiment with a plurality of access points 148 to insert various connections such as network cables, power cables and the like 124 and explosion proof electrical connections 120 which may be the same outgoing or may comprise other types or wiring or which may be plugged. FIG. 14 is shown in cross section along lines 14-14 in FIG. 9. Wiring inserted to access points 148 can connect to junction box 110 as discussed above utilizing a terminal strip represented by connectors 117. The use of two access points 148 will allow numerous explosion proof housings to connect in a daisy-chain configuration thereby reducing cabling "home runs," as may be referred to by those of skill in the art. The "home runs" would require separate wiring for each camera within an explosion proof camera, which is costly. Whereas in the present invention, an extra access point 148 can be used to run to another explosion proof device such as through cable 120 and is secured using access point 148 threaded connection. Alternatively, access port 148 can be plugged.

In one embodiment, integrated component 110 may be utilized with a cylinder comprising only one explosion proof chamber. In other words, explosion proof chamber 102 is not utilized. In this case, explosion proof device 100 has two explosion proof chambers such as explosion proof chamber 106 and terminal cavity 138 that would become a second explosion proof chamber when cap 134 is threadable secured thereto.

Integrated secondary fall protection elements 146 are shown on opposing sides of second bulkhead 136. Second threaded connection 132 and adapter 150 are milled as one unitary piece on each respective side of second bulkhead 136. Adapter 150 may be used to couple additional explosion proof chambers or be covered by cap 134 to seal which then becomes terminal cavity 138 which becomes a third explosion proof chamber.

Figure 15:
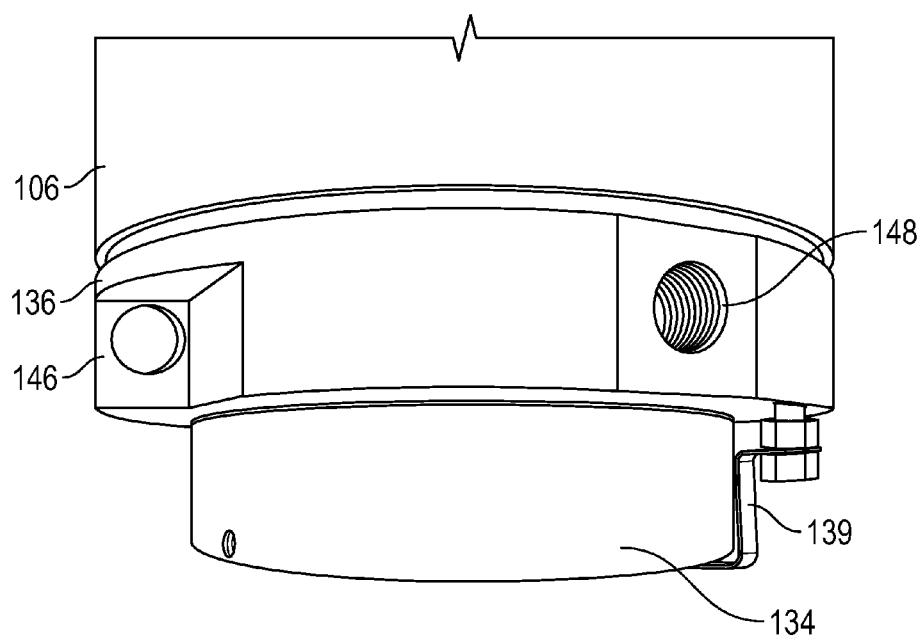
FIG. 15 is a side view of a bracket and bulkhead for a multiple explosion proof chambers device in accordance with one embodiment of the present invention.

Referring to FIG. 15, a side view of mount 146 and second bulkhead 136 for multiple explosion proof chamber device 100 is shown in accordance with one embodiment of the present invention. Second explosion proof chamber 106 is coupled to second bulkhead 136 by second threaded connection 132. Mount 146 can be seen as being milled into second bulkhead 136 as one solid piece. Additionally, access point 148 is milled into the side of the housing of second bulkhead 136 allowing connections to be inserted internally. Cap 134 seals terminal cavity 138 by twisting or rotation onto adapter 150's threaded connection. Cap 134 shows clip or retainer 139 from the base of the bulkhead to the bottom of the cap, that is preferably secured in place with bolts and Nord Lock Washers or other fasteners or lock washers as shown.

The foregoing description of embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. An explosion proof device comprising:
an explosion proof chamber;
a terminal bulkhead on one side of the explosion proof chamber;
a terminal explosion proof chamber on one end of the explosion proof device, wherein the explosion proof chamber and the terminal explosion proof chamber are separated by one or more threaded connections comprising a threaded connection comprising a flame path; and
a cap comprising a cap threaded connection for connecting to the terminal bulkhead, the cap threaded connection comprising a flame path, the cap allowing access to the terminal explosion proof chamber when the cap is removed by rotation; and
an enclosure for a junction box formed within the terminal bulkhead when the cap is rotatably connected to the terminal bulkhead, the junction box comprising wiring connections, the enclosure and junction box being formed within the terminal explosion proof chamber.

2. The explosion proof device of claim 1, wherein the enclosure for the junction box is manufactured into the terminal bulkhead, a threaded connection comprising another flame path between the terminal bulkhead and the explosion proof chamber, and when the cap is threadable secured to the terminal bulkhead then the enclosure and junction box are formed the terminal explosion proof chamber.

3. The explosion proof device of claim 1, further comprising a retainer to retain the cap in position when the cap is threadably secured to the terminal bulkhead.

4. The explosion proof device of claim 1, further comprising an access point machined into the terminal bulkhead, the access point comprising an access point threaded connection through which an external cable is operable for electrical connection with the wiring connections.

5. The explosion proof device of claim 4, further comprising a plurality of access points machined into the terminal bulkhead.

6. The explosion proof device of claim 5, wherein the plurality of access points permit connection between a plurality of explosion proof devices.

7. The explosion proof device of claim 4, wherein the access point threaded connection comprises a flame path.

8. The explosion proof device of claim 1, comprising three explosion proof chambers wherein each of the three explosion proof chambers are separated by a threaded connection comprising a flame path.

9. The explosion proof device of claim 1, further comprising a first explosion proof chamber comprising at least one of a transparent material, a translucent material, or an opaque material.

10. The explosion proof device of claim 9, further comprising the first explosion proof chamber is at least one of a dome shape, a flat shape, or another shape.

11. The explosion proof device of claim 1, wherein the explosion proof device comprises a secondary fall protection element machined into the explosion proof device, the secondary fall protection element comprises an opening operable for connection to a cable to provide secondary fall protection.

12. An explosion proof device comprising:
an explosion proof chamber;
a terminal bulkhead on one side of the explosion proof chamber; and
a secondary fall protection element machined into the explosion proof device, wherein the secondary fall protection element comprises an opening operable for connection to a cable to provide secondary fall protection.

13. The explosion proof device of claim 12, further comprising a cap comprising a threaded connection for connecting to the terminal bulkhead, the threaded connection comprising a flame path.

14. The explosion proof device of claim 13, wherein the cap allowing access to a junction box when the cap is removed by rotation, the junction box being formed within a terminal explosion proof chamber at one end of the explosion proof device.

15. The explosion proof device of claim 14, further comprising an access point machined into the terminal bulkhead, the access point comprising an access point threaded connection through which an external cable enters a junction box for connection with a wiring connection, the wiring connection being formed within the terminal explosion proof chamber.

16. A method for making or using an explosion proof device, comprising:
providing a first explosion proof chamber;
providing a terminal explosion proof chamber on one end of said explosion proof device, wherein each of the first explosion proof chamber and the terminal explosion proof chamber are separated by a threaded connection comprising a flame path;
providing a cap comprising a cap threaded connection for connecting to a terminal bulkhead, providing that the cap threaded connection comprises a flame path; and
providing that the cap allows access to a junction box when the cap is removed by rotation, and when the cap is secured to the terminal bulkhead then the junction box being formed within the terminal explosion proof chamber.

17. The method of claim 16 further comprising:
providing one or more additional explosion proof chambers between said first explosion proof chamber and said terminal explosion proof chamber.

18. The method of claim 16 further comprising:
providing that the terminal bulkhead comprises a threaded access point for connecting external wiring within the junction box, said threaded access point comprising a flame path.

19. The method of claim 18, further comprising a plurality of access points machined into the terminal bulkhead wherein the plurality of access points are operable to permit connection between a plurality of explosion proof devices.

20. The method of claim 16 further comprising:
a secondary fall protection element machined into the explosion proof device,
wherein the secondary fall protection element comprises an opening operable for connection to a cable to provide secondary fall protection.

* * * * *